United States Patent
Yeh et al.

(10) Patent No.: US 6,901,182 B2
(45) Date of Patent: May 31, 2005

(54) RETRO-REFLECTIVE TYPE OPTICAL SIGNAL PROCESSING DEVICE AND METHOD

(75) Inventors: Jer-Liang A. Yeh, Hsinchu (TW); Chih-Chung Chen, Hsinchu (TW); Yen-Jyh Lai, Hsinchu (TW); Wen-Chih Chen, Hsinchu (TW); Chengkuo Lee, Hsinchu (TW)

(73) Assignee: Asia Pacific Microsystems, Inc., Hsinchu (TW)

( * ) Notice: Subject to any disclaimer, the term of this patent is extended or adjusted under 35 U.S.C. 154(b) by 0 days.

(21) Appl. No.: 10/448,392

(22) Filed: May 30, 2003

(65) Prior Publication Data

US 2004/0240779 A1 Dec. 2, 2004

(51) Int. Cl.[7] ................................................. G02B 6/35
(52) U.S. Cl. ......................................... 385/19; 385/140
(58) Field of Search .............................. 385/18–19, 140

(56) References Cited

U.S. PATENT DOCUMENTS

| | | | | |
|---|---|---|---|---|
| 4,422,714 A | * | 12/1983 | Benoit et al. ................. | 385/39 |
| 4,607,160 A | * | 8/1986 | Sakakino ............... | 250/227.21 |
| 4,935,621 A | * | 6/1990 | Pikulski ...................... | 250/229 |
| 5,133,030 A | * | 7/1992 | Lee .............................. | 385/19 |
| 5,175,780 A | * | 12/1992 | Sano et al. ................... | 385/47 |
| 6,301,425 B1 | * | 10/2001 | Espindola et al. .......... | 385/140 |
| 6,636,682 B2 | * | 10/2003 | Wang et al. ................ | 385/140 |
| 6,647,173 B2 | * | 11/2003 | Chen et al. .................. | 385/18 |

* cited by examiner

*Primary Examiner*—Akm Enayet Ullah
*Assistant Examiner*—Jerry T Rahll
(74) *Attorney, Agent, or Firm*—Troxell Law Office, PLLC (57) ABSTRACT

Disclosed is a retro-reflective type optical signal processing device and method, particularly to a device includes a set of optical mirror planes with retro-reflective type layout and configuration, and a set of micro-shutters controlled by microelectromechanical actuators, whereas the optical signals in propagation can be blocked or partially blocked in terms of the position of said a set of micro-shutters corresponding to the optical signal transmission path, thereby the method of said approach to determine the range of attenuated optical signal is a variable optical attenuation function demonstrated by present invention. Such a retro-reflective type optical signal processing device and method further comprises a set of three reflective mirrors and micro-shutters with reflective mirrors. Thereby this device has the capability to switch 2 sets of retro-reflected optical light transmission paths, the method of said approach is a demonstration of 2×2 optical switching function.

9 Claims, 10 Drawing Sheets

RETRO-REFLECTIVE TYPE OPTICAL SIGNAL PROCESSING DEVICE AND METHOD

FIELD OF THE INVENTION

This invention is related to a retro-reflective type optical signal processing device and method, particularly to an optical signal processing device and method for attenuating optical signal, and for switching a set of retro-reflected optical signals by changing the position of a micro-shutter in the light transmission route of retro-reflective light path configuration.

BACKGROUND OF INVENTION

With the rapid development of optical communication, particularly the optical communication network, a 100% optical system eliminating optical/electrical conversion has become the mainstream of the development. An optical communication network requires direct processing of the optical signal per se, such as controlling the intensity of the optical signal by means of an optical attenuator so as to perform dynamic manipulation of signals at each channel to an appropriate degree, to maintain optimum performance and safety of the optical transmission active and passive components, to simplify the system. The switching between different optical paths relies on optical switches. A high-performance, low-cost optical signal processing device has, thus, become an essential component in such system.

Most conventional optical signal processing devices use switching devices of the mechanical types, where such mechanical switches usually involve high production cost resulted from the precision alignment and calibration of optical paths, inability of being produced in batches, and the disadvantages of being easily worn. The use of micro-mechanical-electrical system (MEMS) to produce optical signal processing devices can not only dramatically reduce components sizes, but also allow batch production by adopting processes similar to those adopted in semi-conductors, while providing high production precision and reducing production cost at the same time.

DESCRIPTION OF PRIOR ART

Figure 1A:
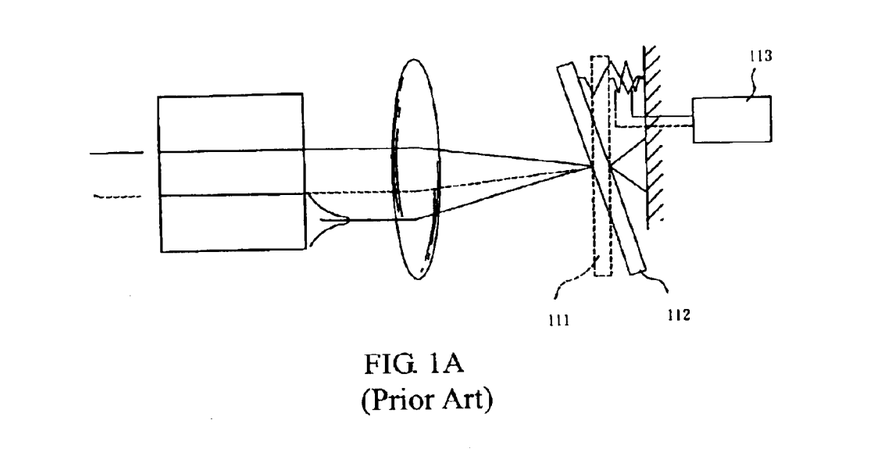
FIG. 1A is a schematic view of a variable optical attenuator disclosed in U.S. Pat. No. 6,137,941.

MEMS optical signal processing devices have been adopted in the production of variable optical attenuators and optical switches, described as follows:

1) A variable optical attenuator developed by Robinson in U.S. Pat. No. 6,137,941 ('941 patent) is illustrated in FIG. 1A. The variable optical attenuator comprises: a focusing lens; a 2-fiber capillary having an input optical waveguide and an output optical waveguide; an MEMS reflective mirror and an MEMS pivot for supporting and pivoting the reflective mirror. The reflective mirror is static- or piezo-electrically driven to revolve about the pivot. The reflective mirror at a flat position 111 reflects off an incident beam from the input waveguide to be refracted by the focusing lens so as to become a refracted beam, that is then reflected off by the reflective mirror to be refracted by the focusing lens so as to enter the output waveguide. In an optimum state, the optical signal completely enters the output end. The angle of the reflective mirror changes when the reflective mirror is pivoted to a reflective position 112. Hence, pivoting of the reflective mirror changes the angle of the reflective mirror and the optical path of the reflected beam, such that only part of the reflected beam enters the output waveguide for reducing the intensity of the reflected beam entering the output waveguide, thereby attaining the variable function of the light attenuator. Further, as shown in FIG. 1A, the '941 patent further discloses a digital mirror device to replace the pivoted reflective mirror. However, because the reflective mirror of the optical attenuator in the '941 patent has a highly sensitive angle of reflection, such as 20 db@0.1°, 40 db @0.35°, or even better, an automatic high-precision control apparatus 113 is needed to vary the reflective mirror. As compared to this invention, the materials as used, the structure as adopted, the production and operation processes are all different. In this invention, there is no need for a complicated, high-precision automatic control apparatus or any corresponding high-precision component thereby eliminating the costly production processes and simplifying the production process that allows easy assembly and improves the pass rate.

Figure 1B:
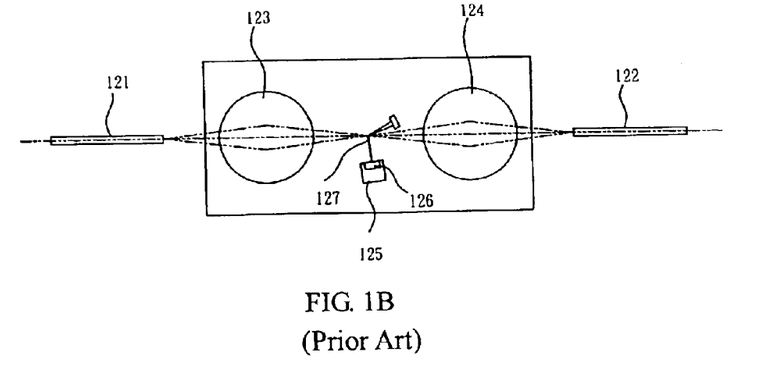
FIG. 1B is a schematic view of a variable optical attenuator with profiled blade disclosed in U.S. Pat. No. 6,246,826.

2) A variable optical attenuator with profiled blade developed by O'Keefe and etc in U.S. Pat. No. 6,246,826 ('826 patent) is illustrated in FIG. 1B. The variable optical attenuator includes an input fiber 121 and an output fiber 122; two ball lenses 123, 124; an optical attenuator 125 having an actuator 126 and a profiled blade 127 mounted between the input fiber 121 and output fiber 122. A comb drive or other actuating means drives parallel advancement of the blades of different profiles mounted to the actuator for blocking part of the optical signal being transmitted thereby attaining the variable function of the light attenuator. The '826 patent, however, requires high-precision alignment and calibration of the optical path formed by the input fiber 121, two ball lens 123, 124, and output fiber 122. In addition to the difficulty involved in the alignment and calibration, the overall errors of the system are so significant to result in costly batch production. As compared to the second embodiment of this invention, the materials as used, the structure as adopted, and the production and operation processes are all different. This invention further allows retro-reflective optical signal processing and only requires alignment and calibration among an input fiber, an output fiber and a retro-reflector thereby eliminating the complicated, high-precision alignment and calibration process. As compared to the '826 patent, this invention eliminates the costly production processes and simplifies the production process that allows easy assembly and improves the pass rate.

Figure 1C:
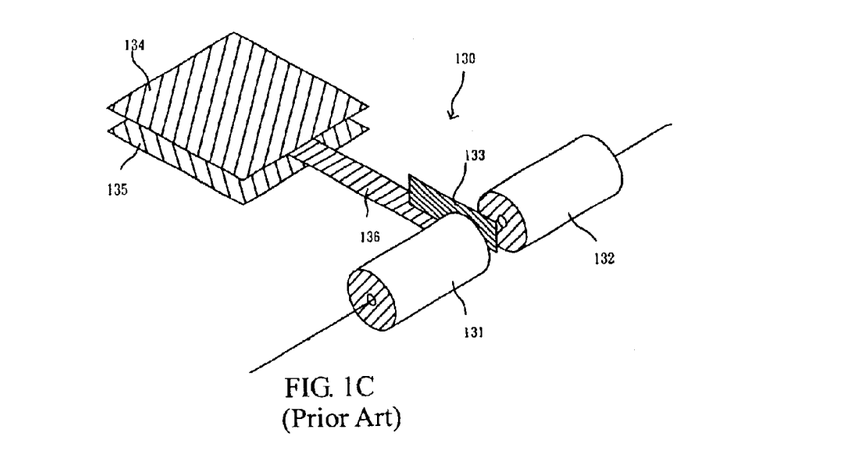
FIG. 1C is a schematic view of a variable optical attenuator with profiled blade disclosed in U.S. Pat. No. 6,246,826, that may also serve as an optical switch disclosed in U.S. Pat. No. 6,205,267.

3) An optical attenuator developed by Aksyuk and etc in U.S. Pat. No. 6,173,105 ('105 patent) is illustrated in FIG. 1C. The variable optical attenuator 130 comprises: an input fiber 131 and an output fiber 132; an optical attenuator having a profiled shutter 133 and an actuator. The actuator further comprises an upper polysilicon capacitive plate 134 and a lower polysilicon capacitive plate 135. The profiled shutter is connected to the upper capacitive plate 134 by means of a cantilever beam 136. The optical attenuator is provided between the input fiber 131 and output fiber 132. The static-electrically driven actuator provided between the two parallel capacitive plates drives vertical movement of the shutter 131 between the input fiber 131 and output fiber 132. Through the lever linked to the upper capacitive plate 134, the shutter 133 moves vertically between the input fiber 131 and output fiber 132, thereby blocking part of the optical signal being transmitted to attain the variable function of the light attenuator. As compared to the second embodiment of this invention, the materials as used, the structure as adopted, and the production and operation processes are all different. Further, the back reflection caused by the shutter in the '105 patent requires an additional isolator to be provided to the front end of the input fiber thereby increasing the insertion loss and production cost of the entire device.

Items 1) to 3) as described above are prior art relevant to the second embodiment of this invention. Items 4) and 5) as described below are prior art relevant to the third embodiment of this invention.

Figures 1D, 1E, 3A:
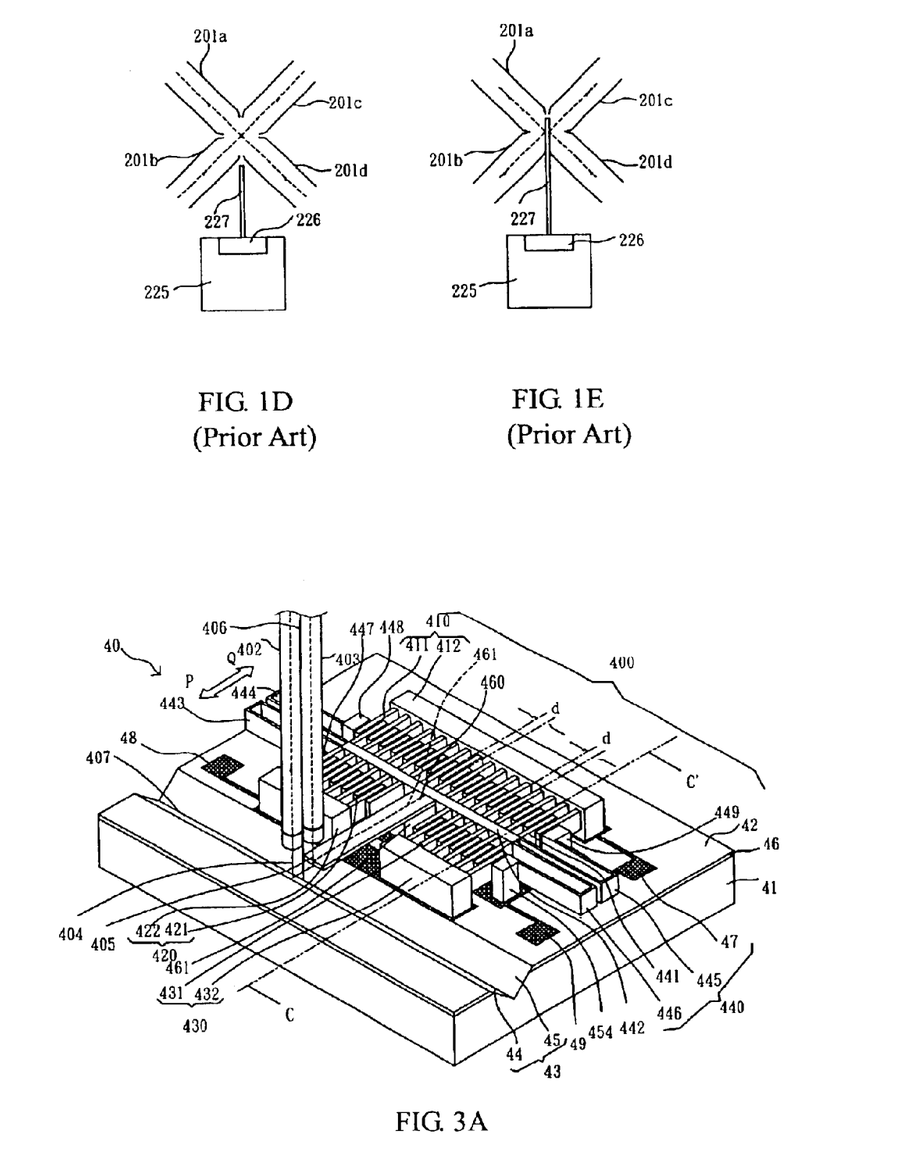
FIGS. 1D and 1E are schematic views of a micro-electromechanical optical switch and method of manufacture disclosed in U.S. Pat. No. 6,229,640.
FIG. 3A is a perspective, schematic view of a second embodiment of the retro-reflective type optical signal processing device according to this invention.

4) A micro-electro-mechanical optical switch and method of manufacture thereof developed by Zhang in U.S. Pat. No. 6,229,640 ('640 patent) is illustrated in FIG. 1D. The optical switch comprises: a first optical signal input fiber 201a, a second optical signal input fiber 201c, a first optical signal output fiber 201b, a second optical signal output fiber 201d, and an optical switch actuator 225. The optical switch actuator 225 comprises: a static comb drive 226 and a shutter 227 driven by the comb drive 226 to move forwards and backwards in a horizontal direction. As shown in FIG. 1D, when the comb drive 226 drives the shutter 227 to move backwards, optical signals from the first optical signal input fiber 201a and second optical signal input fiber 201c may each bypass by the shutter 227 to enter the optical actuator 225 and to leave the second optical signal output fiber 201d and first optical signal output fiber 20b, respectively. As shown in FIG. 1E, when the shutter 227 moves forwards, the shutter 227 blocks and reflects off the two incident beams and changes their optical paths, such that optical signals from the first optical signal input fiber 201a and second optical signal input fiber 201c are reflected off by the shutter 227 of the optical switch actuator 225 to leave the first optical signal output fiber 201b and second optical signal output fiber 201d, respectively, thereby attaining the variable function of the light attenuator by blocking or allowing the light beams to pass through. In the '640 patent, high-precision alignment and calibration and assembly is required among the relative positions of five components, including the first optical signal input fiber 201a, second optical signal input fiber 201c, first optical signal output fiber 201b, second optical signal output fiber 201d, and shutter 227. As compared to the third embodiment of this invention, the materials as used, the structure as adopted, and the production and operation processes are all different. Further, the third embodiment in this invention only requires a single assembling process between the optical signal transmission end and retro-reflective type optical signal processing device, thereby eliminating the inter-coupling between individual components and significantly reducing production lead time and cost while improving the pass rate at the same time.

Figure 1F:
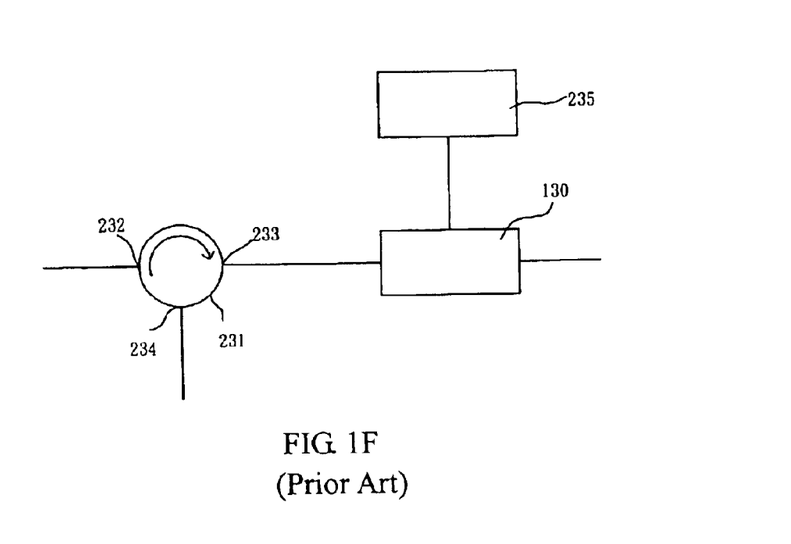
FIG. 1F is a schematic view of an optical switch disclosed in U.S. Pat. No. 6,205,267.

5) An optical switch developed by Aksyuk and etc in U.S. Pat. No. 6,205,267 ('267 patent) is illustrated in FIGS. 1C and 1F. The '267 patent uses the basic structure of the optical attenuator 30 described in Item 3) while controlling the shutter 133 to completely block or not to block an optical path. A circulator 231 is further implemented. A control apparatus 235 may close the optical switch such that the shutter 133 is completely absent from the optical path, such that an optical signal from the input fiber 131 may enter a first port 232 of the circulator 231 to leave the output fiber 132 from a second port 233. On the other hand, the control apparatus 231 may open the optical switch such that the shutter 133 completely blocks the optical path, such that an optical signal from the input fiber 13 is reflected off by the shutter 133 to enter circulator 231 to be guided to a new optical path through a third port 234, serving as a 1×2 optical switch. As compared to the third embodiment of this invention, the materials as used, the structure as adopted, and the production and operation processes are all different. Further, the '267 patent further involves the following defects:

1. The production cost increases due to the additional circulator.
2. The insertion loss is significant for the entire device (including the circulator).

SUMMARY OF INVENTION

Hence, it is an object of this invention to provide a retro-reflective type optical signal processing device that can be produced easily in batch type production environment with lower cost, while reliability and operation stability is achieved via present invention.

According to this invention, a set of retro-reflective optical elements of the present invented device enables that the incident optical signal will be retro-reflected after twice reflection of light among incident light path, the reflective surface of two mirrors of said a set of retro-reflective optical elements, and the output light path. Thereby the reflected output optical signal light path is in parallel with the light path of incident optical signal, and their light propagation direction is opposite, in the other words, the light transmission direction of input and output signal is opposite direction. The said a set of retro-reflective optical elements can be made by means of silicon micro-fabrication technology, or be assembled by integration of several optical components, such as prisms, lenses, or reflective mirrors.

Further, the micromachined shutter is allocated at the transmission route of the said device. The optical beams in propagation can be blocked or partially blocked in terms of the position of said shutter corresponding to the transmission path, thereby the method of said approach to determine the range of attenuated optical signal is a variable optical attenuation function demonstrated by present invention. The said shutter is controlled and actuated via micro-actuators.

A further main embodiment is that such a retro-reflective type optical signal processing device and method further comprises a set of three reflective mirrors and micro-shutters with reflective mirrors. Likewise, this device has the capability of 2×2 optical switch function by composing two sets of two parallel ports consist of first port as the input channel and the second port as the output channel of each sets. The two different optical signals from two input ports of each sets transmit toward a retro-reflective unit including three reflective mirror planes, where the shutter is at the position enabling the said optical signals passing by, in which the shutter is an ON state, thereafter the two sets of retro-reflected optical signals transmit backward independently to the output ports of each corresponding sets. Furthermore, when the shutter is allocated at the position of an OFF state, thus the two different optical signals from two input ports of each sets transmit toward the said reflective mirror surface of said shutter, the incoming signals will reflected independently toward the corresponding output ports of opposite sets. Thereby this device has the capability to switch 2sets of retro-reflected optical light transmission paths by holding the shutter at an ON state or an OFF state so as to 2×2 optical switching function is demonstrated by the said retro-reflective type optical signal processing device.

Embodiments of the present invention can provide a retro-reflective type optical signal processing device and method, having the function of a variable optical attenuator, that the high attenuation resolution is realized by a simple structure and is easily driven and controlled.

Another embodiment of this invention is to provide 2×2 optical switching function by allowing the forward transmission and reflection of a set of two parallel incident optical signals in the retro-reflective type light configuration.

A further embodiment of this invention is to provide a retro-reflective type optical signal processing device and method that does not need isolator to eliminate the back-reflected light in the transmission route of input channel.

A further embodiment of this invention is to provide a retro-reflective type optical signal processing device and method that only requires a single assembling process to align, place, assemble, and fix the fibers, the said a set of retro-reflective optical elements, and micromachined shutter to form the invented device, thereby the production cost is reduced.

The structure of the retro-reflective type optical signal processing device and the details of the method of this invention can be fully understood by referring to the detailed descriptions in accompaniment of the following drawings.

DESCRIPTION OF PREFERRED EMBODIMENTS

The following descriptions of this invention should be referred to the accompanying drawings. Persons skilled in the art should realize that the following descriptions are provided for exemplary purposes rather than limiting the scope of this invention.

The followings are descriptions with respect to an exemplary embodiment for manufacturing the retro-reflective type optical signal processing devices according to this invention. In this embodiment, polysilicon deposited by Low Pressure Chemical Vapor Deposition (LPCVD) serves as a structural material; the lens surface is made by sputtered gold; silicon dioxide serves as a sacrificial layer. An actuator suspension structure having a shutter is fabricated by etching the sacrificial layer and the silicon structural layer. The features of a variable optical attenuator and an optical switch are achieved by applying appropriate voltages to control the actuator driving the shutter for blocking part or all of the optical signal transmission. The fabrication of the components, in fact, does not completely coincide with the method as described. Persons skilled in the art can certainly make modifications and changes to such a method without departing from the spirits and scope of this invention. For example, the sequence of the method for manufacturing the retro-reflective type optical signal processing devices as described below may be changed to fabricate similar structures having identical effects.

Prior art illustrated in FIGS. 1A~1D have been described and not repeated herein.

First Embodiment

Figure 2A:
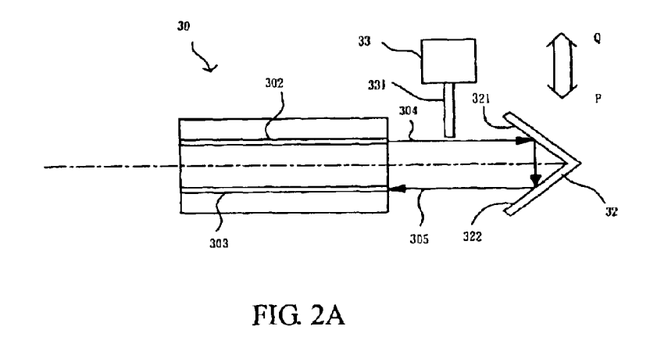
FIG. 2A is a schematic view of a first type of a first embodiment of the retro-reflective type optical signal processing device according to this invention.
Figure 2B:
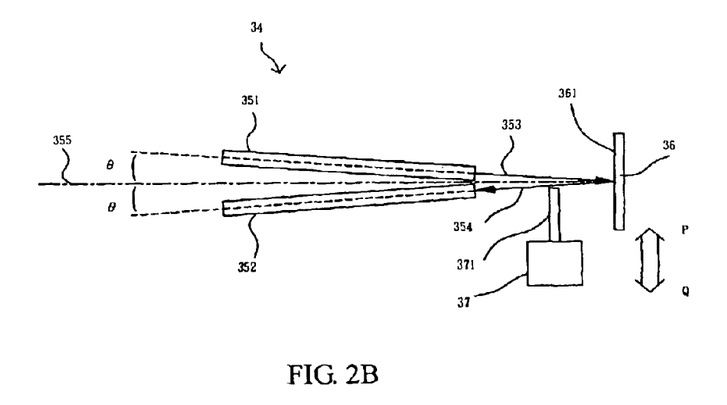
FIG. 2B is a schematic view of a second type of a first embodiment of the retro-reflective type optical signal processing device according to this invention.

FIGS. 2A and 2B illustrate a first type and a second type of the first embodiment of a retro-reflective type optical signal processing device according to this invention, respectively. The first type of the retro-reflective type optical signal processing device 30 comprises: paired parallel fibers having an input fiber 302 and an output fiber 303, for inputting an incident optical signal 304 and outputting a reflective optical signal 305, respectively; a retro-reflective micro-mechanical-electrical reflector 32 having a first reflective mirror 321 and a second reflective mirror 322 normal to the first reflective mirror 321; a microactuator 33 for actuating a shutter 331 to move along the PQ directions and to block part of the incident optical signal 304 so as to attenuate optical signal. A first type of the retro-reflective type optical signal processing device 30 reflects the incident optical signal 304 off the first reflective mirror 321 and reflective mirror 322 to form a reflective optical signal 305 leaving the output fiber 303. The detailed method for assembling and aligning the device may be referred to the second embodiment of this invention.

The second type of the retro-reflective type optical signal processing device 34 comprises: an input fiber 351 and an output fiber 352 having a centerline therebetween, for inputting an incident optical signal 353 and outputting a reflective optical signal 354, respectively, the input fiber 351 and output fiber 352 each forming an included Θ with the centerline 355; a retro-reflective micro-mechanical-electrical reflective unit 36, having a reflective mirror 361; a microactuator 37 for actuating a shutter 371 to move along the PQ directions and to block part of the reflective optical signal 354 so as to attenuate optical signal. In assembling the second type of the retro-reflective type optical signal processing device 34, one only needs to place the centerline 355 at a position normal to the reflective mirror 361, and align the reflective optical signal 354 with the output fiber 352, the reflective mirror 361 will reflect the incident optical signal 353 off the reflective mirror 361 to form a reflective optical signal 354 leaving from the output fiber 352.

In the first type, the incident optical signal 304 is parallel to the reflective optical signal 305. In the second type, the incident optical signal 353 is not necessarily parallel to the reflective optical signal 354. In the first to third embodiments of the retro-reflective type optical signal processing device of this invention, the microactuator of the shutter can be an MEMS actuator including the electrostatic actuator, the thermal actuator, the electrothermal actuator, the electromagnetic actuator, and the piezoelectric actuator, which are all related to conventional art easily mastered by persons skilled MEMS techniques. Hence, other than the MEMS electrostatic actuator described in the second embodiment, this invention does not provide further explanations with respect to the other types of MEMS actuators.

For explanations relevant to the prior art or to this invention, all terminologies of the input/output units in this specification, such as input fiber, output fiber, optical signal input unit, optical signal output unit are given in reference to the device of this invention or prior art. For example, an input fiber refers to a fiber for inputting an optical signal to the device of prior art or this invention; and an optical signal input unit refers to a unit for outputting an optical signal from the device of prior art or this invention.

In the first to third embodiments of the retro-reflective type optical signal processing device of this invention, any optical signal path formed by any incident optical signal and its reflective optical signal may further include a collimating lens, collecting lens, a ball lens, a cylindrical lens, a refractor such as Fresnel lens, other non-spherical lenses and optical components so as to enhance the transmission efficiency and coupling efficiency of the optical signal in the retro-reflective type optical signal processing device, and to reduce signal dissipation in transmission by refracting the optical signal in the optical path. Further, the shutter in the first to third embodiments of this invention may block part of the incident optical signal or the reflective optical signal so as to attenuate the optical signal.

Second Embodiment

FIG. 3A is a perspective, schematic view of a second embodiment of the retro-reflective type optical signal processing device according to this invention. FIG. 3G is a schematic view taking alone lines C–C' in FIG. 3A. In FIG. 3A, the retro-reflective type optical signal processing device 40 of this invention is fabricated over a platform 42 of a silicon substrate by means of micro-fabrication process, as shown in FIGS. 3C~3G that will be described in details later on.

The retro-reflective type optical signal processing device 40 of this invention comprises: paired parallel fibers having an input fiber 402 and an output fiber 403 for inputting an incident optical signal 405 and outputting an reflective optical signal 404, respectively; a retro-reflective micro-mechanical-electrical reflective unit 43, having a first reflective mirror 44 and a second reflective mirror 45 each forming an included angel of 45° with the platform 42 of the silicon substrate 41, the first reflective mirror 44 and second reflective mirror 45 forming an included angle of 90° therebetween that takes the form of a 90° V-groove and intersecting at a baseline 407 of the V-groove; a comb-drive microactuator 400 provided on the platform 42, the comb-drive microactuator 400 being an MEMS static-electrically driven actuator, having a first comb unit 410, a second comb unit 420, a third comb unit 430, a suspended comb unit 440, and a shutter 460 defining a shutter centerline 461. The first, second and third comb units 410, 420, 430 are constructed of plural stators 411, 421, 431, respectively, the plural stators 411, 421, 431 are spaced apart by a gap d and connected to a first base 412, a second base 422, and a third base 432 at their rear ends, respectively. The suspended comb unit 440 are constructed of plural rotors 441 spaced apart by a gap d and, respectively, connected to a cantilever 442 over a fourth base 447, a fifth base 448, a sixth base 449 and a seventh base 454 through a first elastic suspension unit 443, a second elastic suspension unit 444, a third elastic suspension unit 445, and a fourth elastic suspension unit 446 that are connected to the cantilever 442, such that the suspended comb unit 440 is suspended among the first elastic suspension unit 443, second elastic suspension unit 444, third elastic suspension unit 445 and fourth elastic suspension unit 446. The shutter 460 faces the first reflective mirror 44 and second reflective mirror 45 and is connected to and supported by a center of the suspended comb unit 440 to move along the PQ directions with the suspended comb unit 440 of the comb-drive microactuator 400.

Figure 3B:
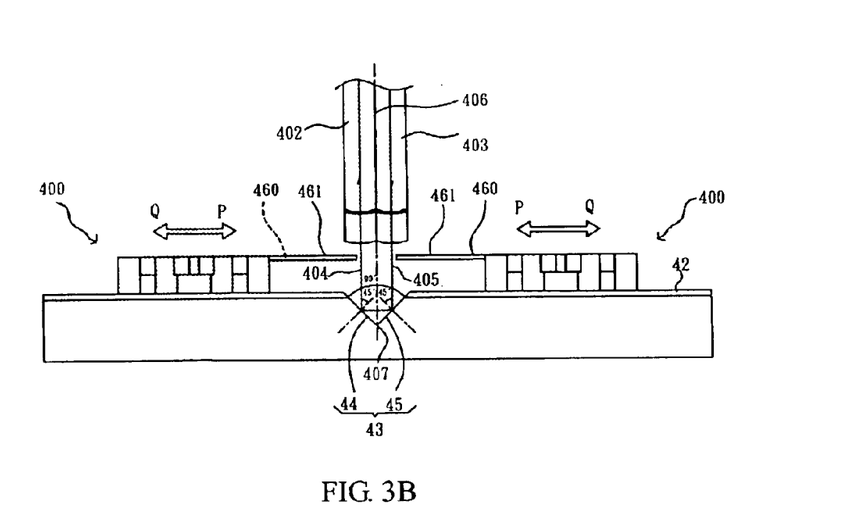
FIG. 3B is a schematic view showing the second embodiment of the retro-reflective type optical signal processing device according to this invention under the assembling and operative state.
Figure 3C:
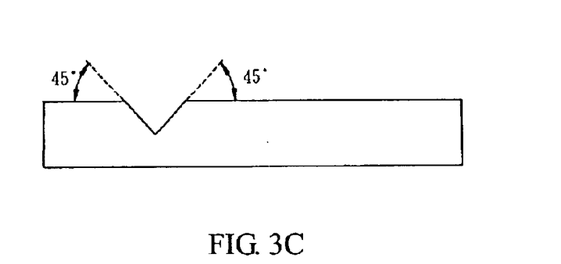
FIGS. 3C~3G are schematic views taking alone lines C–C' in FIG. 3A, showing the actual manufacturing process of the second embodiment of the retro-reflective type optical signal processing device according to this invention.
Figure 3D:
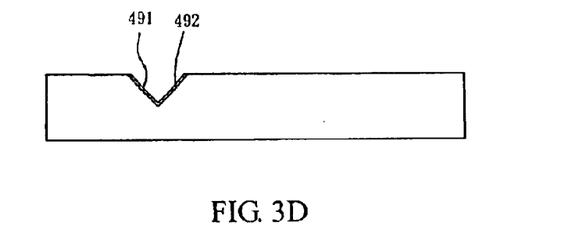
Figure 3E:
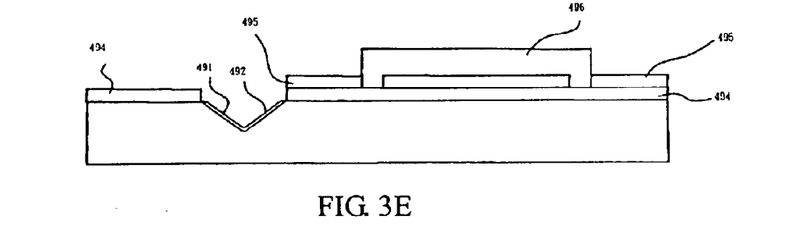
Figure 3F:
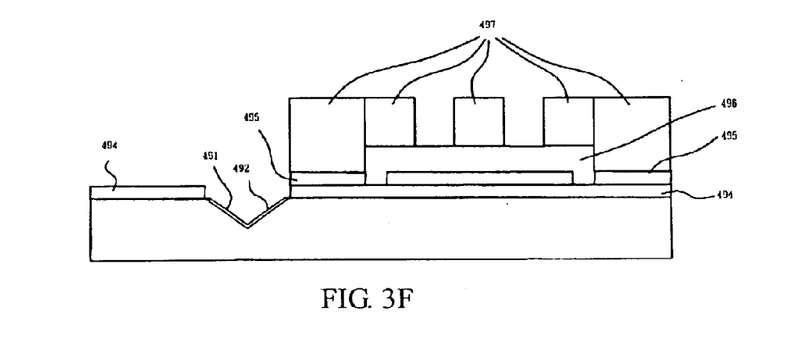
Figure 3G:
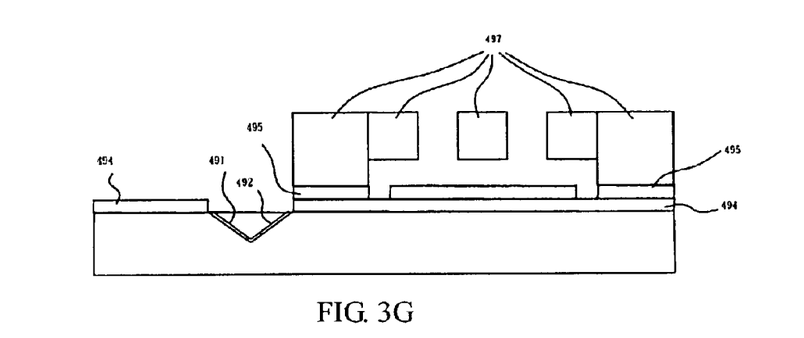

FIG. 3B is a schematic view showing the second embodiment of the retro-reflective type optical signal processing device according to this invention under the assembling and operative state. As shown in FIG. 3B, one feature of the second embodiment of this invention lies in that, only a single process is needed to assemble the retro-reflective type optical signal processing device 40. The assembling process aligns a centerline 406 of the paired parallel fibers (or 2-fiber capillary) with the baseline 407 formed of intersecting the first reflective mirror 44 and second reflective mirror 45, such that the incident optical signal 404 is able to project towards the first reflective mirror 44 at an incident angle of 45°, and then reflected off by the second reflective mirror 45 at a reflective angle of 45°. Because the second reflective mirror 45 and first reflective mirror 44 are normal to one another by an included angle of 90°, a reflective optical signal 405 is formed by reflecting the incident optical signal 404 that is projected towards the second reflective mirror 45 at an incident angle of 45°, off the second reflective mirror 45 at a reflective angle of 45°. In an optimum state, the reflective optical signal 405 is completely coupled into the output fiber 403 to complete a retro-reflective optical signal processing process. Further, the input port of the input fiber 402 and the output port of the output fiber 403 may be connected to a light source and a signal sensor (not shown), respectively, to assist in assembling and positioning.

The optimum positioning by adopting above-mentioned assembling step is not exclusive. Such as shown in FIG. 3A, as long as the incident optical signal 404 of paired parallel fibers, reflective optical signal 405, and centerline 406 of the paired parallel fibers are co-planar, and the reflective optical signal 404 is projected towards the first reflective mirror 44 at an angle less then 45°, the incident optical signal 404 will be surely parallel to the reflective optical signal 405 and projected towards an opposite direction while the vertical distance between the two parallel signals varies along with the incident position. Hence, by continuously adjusting the incident optical signal 404 projecting towards the first reflective mirror 44 at an appropriate incident angle that subjects the vertical distance between the incident optical signal 404 and reflective optical signal 405 in parallel equals to the gap between the centers of the paired parallel fibers, the reflective optical signal 405 may completely enter the output fiber 403.

As shown in FIG. 3A, the retro-reflective type optical signal processing device 40 of this invention may further comprises: a silicon nitride or a silicon oxide insulating layer 46 between the silicon substrate 41 and electrodes to prevent shorting circuits between electrodes, a first electrode 47, a second electrode 48 and a third electrode 49 electroplated above the insulating layer. The first electrode 47 represents voltage applied to the first comb unit 410, the second electrode 48 represents voltages applied to the second comb unit 420 and third comb unit 430, and the third electrode 49 represents voltage applied to the suspended comb unit 440.

An actuating control apparatus (not shown) and additional voltage control are implemented to generate a potential difference between the second electrode 48 and third electrode 49 thereby causing the electrostatic attractive force between the second comb unit 420 and third comb unit 430, and to generate zero potential different between the first electrode 47 and third electrode 49 thereby causing simultaneous-advancement displacement of the suspended comb unit 440 of the comb-drive microactuator 400 and the shutter 450 in the P direction. On the other hand, an external voltage may be applied to generate a potential difference between the first electrode 47 and third electrode 49 thereby causing the electrostatic attractive force between the first comb unit 410 and suspended comb unit 440, and to generate a zero potential difference between the second electrode 48 and third electrode 49 thereby causing simultaneous movement of the suspended comb unit 440 of the comb-drive microactuator 400 and the shutter in the Q direction.

Furthermore, the fourth base 447, fifth base 448, sixth base 449 and seventh base 450 of the suspended comb unit 440 are connected to the electrode 48; that is, equal potential is maintains between the suspended comb unit 440 and the large-area electrode 48 located therebeneath so as to ensure no sticking phenomenon between the suspended comb unit 440 of the comb-drive microactuator 400 and the bases due to electrostatic attraction during the forward and backward movement.

By independently controlling the potential differences between the second electrode 47 and third electrode 48 and between the firs electrode 46 and third electrode 48, as well as the magnitudes of electrostatic forces of the plural stators 411, 421, 431 and rotors 441, the advancement of the shutter in the P direction may be varied.

As shown in FIG. 3B, in the second embodiment of the retro-reflective type optical signal processing device 40, a shutter 460 may be provided next to the incident optical signal 404 or the reflective optical signal 405. The shutter 460 may include any opaque substances. The shutter may also be configured to various microstructures, such as spheres, triangles, rectangles or polygons. The shutter 460 may be made from one or more materials, or a material having a light pervious characteristic that may be transformed into light impervious in response to heat treatment or pressure. The shutter 40 is connected to the comb-drive microactuator 400 that is controlled by an externally applied voltage through the actuating control apparatus as described above, thereby actuating the shutter, such that the shutter is able to move along the PQ directions based on different control signals to all distances within a blocking range, or to remain still at any position of all distances, for blocking part of the incident optical signal 404 or part of the reflective optical signal 405. Because blocking range due to shutter movement may range from 0% (no blocking) to 100% (all blocking), another feature of the second embodiment of the retro-reflective type optical signal processing device 40 of this invention lies in that, the reflective optical signal 405 may be selected and varied by selecting and varying the incident optical signal 404, so as to serve a variable optical attenuator to be implemented in an optical communication network(s).

FIGS. 3C~3G are schematic views taking alone lines C–C' in FIG. 3A, showing the actual manufacturing process of the second embodiment of the retro-reflective type optical signal processing device according to this invention.

First, a retro-reflective reflective lens surface is etched on a silicon substrate by anisotropic wet etch. Because the etching rate of a (110) plane of silicon under particular etching conditions is less than that of a (100) plane of silicon, two (110) planes of silicon that form a 450 with the silicon substrate surface are exposed after a given etching time (see FIG. 3C). A high reflectivity metal film is then sputtered over the two (110) planes of silicon by sputtering, electroplating, or chemical deposition to form a first reflective mirror 491 and a second reflective mirror 492 (see FIG. 3D). The first reflective mirror and second reflective mirror may be fabricated by the above-described bulk silicon microfabrication, electroplating, sputtering, or other processes, replaced by various optical components capable of reflection, such as those composed of prisms, lenses, or reflective mirrors. The optical components used by the first reflective mirror 491 and second reflective mirror 492 may vary from one to more.

A silicon nitride insulating layer 494 is then deposited to prevent from short circuits between electrodes. An electrode layer 495 is next electroplated thereabove by electroplating or sputtering. A sacrificial layer 496 is the fabricated by chemical deposition process (see FIG. 3E). A comb-drive microactuator structure and a shutter 497 are then fabricated by chemical deposition process and anisotropic etch (see FIG. 3F). The sacrificial layer 496 is finally removed by anisotropic etch so as to cause the suspension structure comb-drive microactuator to suspend above the lower capacitive plate (see FIG. 3G).

Figure 3H:
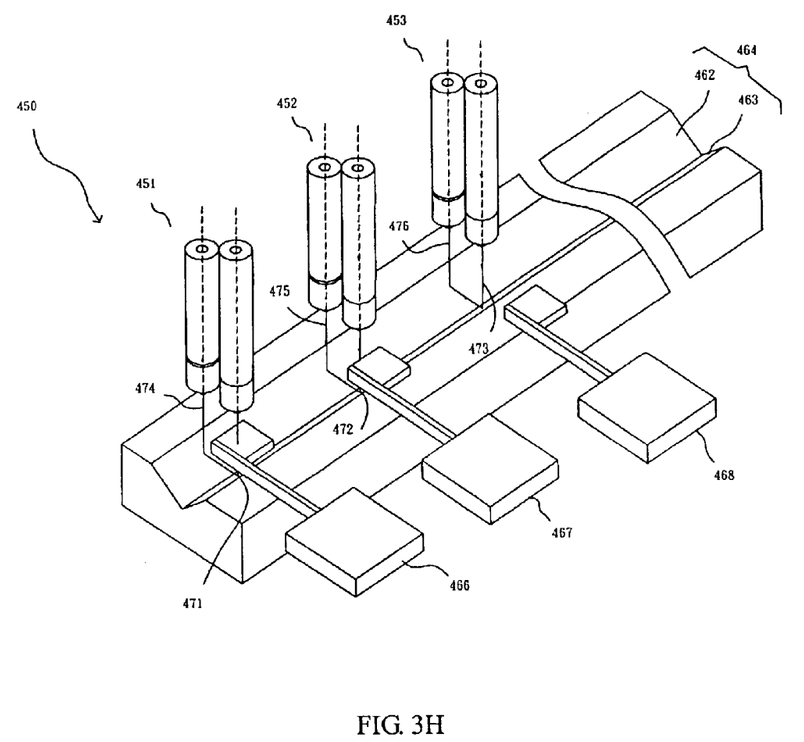
FIG. 3H is a perspective, schematic view of a second embodiment of the retro-reflective type optical signal processing device array according to this invention.

As shown in FIG. 3H, plural retro-reflective type optical signal processing devices 40 according to the second embodiments may also be embodied to construct a retro-reflective type optical signal processing device array 450, including: a retro-reflective micro-mechanical-electrical reflective unit 464 having a first reflective mirror 462 and a second reflective mirror 463, a first retro-reflective type optical signal processing device 451, a second retro-reflective type optical signal processing device 452, and a third retro-reflective type optical signal processing device 453 that are the same as the retro-reflective type optical signal processing device 40 as shown in FIGS. 3A and 3B. Details of the comb-drive microactuator, electrodes, and actuating control apparatus are the same and, thus, not repeated herein. A diagram is used in FIG. 3H to represent a comb-drive microactuator, wherein the first retro-reflective type optical signal processing device 451 is actuated by a comb-drive microactuator 466 for completely blocking a first reflective optical signal 471 of the first retro-reflective type optical signal processing device 451; the second retro-reflective type optical signal processing device 552 is actuated by a second comb-drive microactuator 476 for partially blocking a second reflective optical signal 472 of the second retro-reflective type optical signal processing device 452; the third retro-reflective type optical signal processing device 453 is actuated by a third comb-drive microactuator 486 not blocking a third reflective optical signal 473 of the third retro-reflective type optical signal processing device 453. One feature of this retro-reflective type optical signal processing device array 450 lies in that, each of the retro-reflective type optical signal processing devices 451, 452, 453 may independently vary an optical signal. Another feature of this embodiment lies in that, the retro-reflective micro-mechanical-electrical reflective unit 464 having a first reflective mirror 462 and a second reflective mirror 463 may serve to vary retro-reflective optical signal of optical signals from different channels at each of the retro-reflective type optical signal processing devices 451, 452, 453. Furthermore, the first retro-reflective type optical signal processing device 451, second retro-reflective type optical signal processing device 452 and third retro-reflective type optical signal processing device 453 in the retro-reflective type optical signal processing device array 450 as shown in FIG. 3H may also be provided next to the first incident optical signal 474, second incident optical signal 475 and third incident optical signal 476, such that each of the retro-reflective type optical signal processing devices may serve to vary optical signals of an incident optical signal along an incident optical path. Furthermore, plural retro-reflective type optical signal processing device arrays 450 in this embodiment may be, at desires, embodied to construct a single or plural lenses structure array, serving as a network retro-reflective type optical signal processing device having the feature of a variable optical attenuator, for ready implementation in an optical communication network(s).

Third Embodiment

Figure 4A:
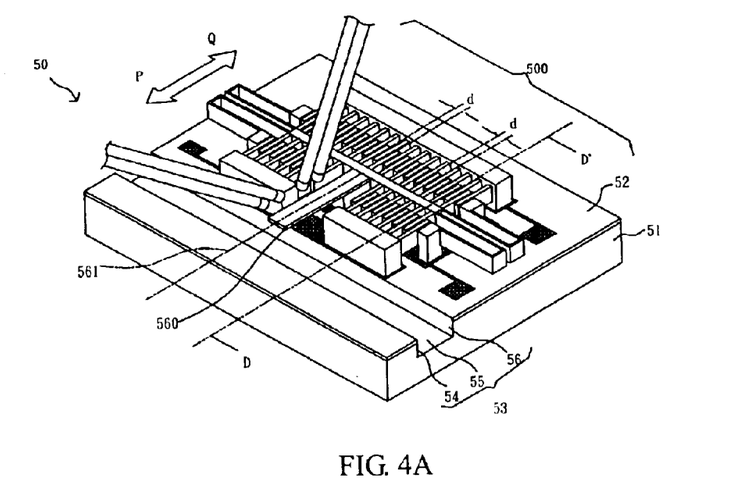
FIG. 4A is a perspective, schematic view of a third embodiment of the retro-reflective type optical signal processing device according to this invention.
Figure 4B:
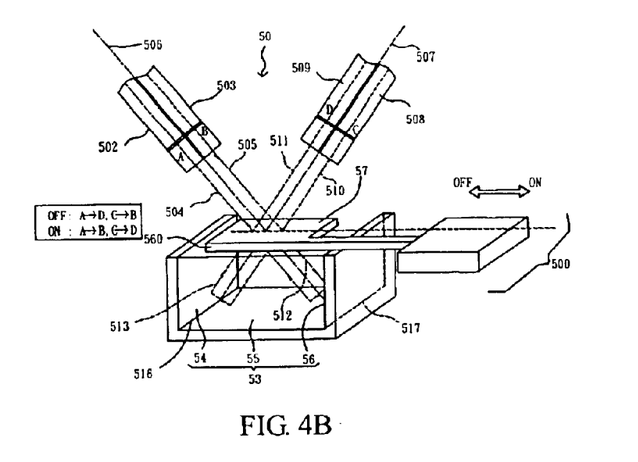
FIG. 4B is a schematic view showing the third embodiment of the retro-reflective type optical signal processing device according to this invention under the assembling and operative state.
Figure 4C:
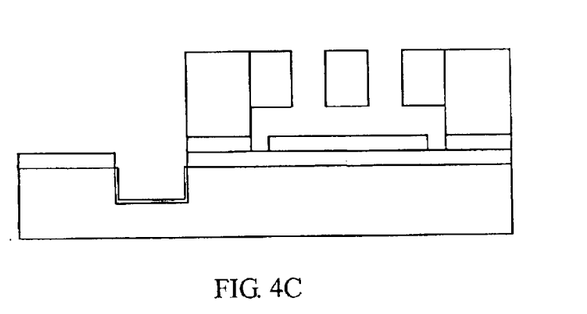
FIG. 4C is a schematic view taking alone lines D–D' in FIG. 4A, showing the third embodiment of the retro-reflective type optical signal processing device according to this invention.

FIG. 4A is a perspective, schematic view of a third embodiment of the retro-reflective type optical signal processing device according to this invention. FIG. 4B is a schematic view showing the third embodiment of the retro-reflective type optical signal processing device according to this invention under the assembling and operative state. FIG. 4C is a schematic view taking alone line D–D' in FIG. 4A, showing the third embodiment.

As shown in FIG. 4A, the retro-reflective type optical signal processing device 50 of this invention is fabricated over a platform 52 of a silicon substrate 51. As shown in FIG. 4B, the retro-reflective type optical signal processing device 50 of this invention comprises: a first pair of parallel fibers and a second pair of parallel fibers, the first pair of parallel fibers including a first optical signal input unit 502 and a first optical signal output unit 503, the second pair of parallel fibers including a second input fiber 508 and a second output fiber 509, the first input fiber unit 502 and second input fiber 508 serving to input a first incident optical signal 504 and a second incident optical signal 510; a micro-mechanical-electrical retro-reflective unit 53, having a first reflective mirror 54, a second reflective mirror 55 and a third reflective mirror 56, the second reflective mirror 55 being provided a location parallel to the platform 52 of the silicon substrate 51 (see FIG. 4A), the first reflective mirror 54 and third reflective mirror 56 facing one another and normal to the second reflective mirror 55 to form a U-groove having two right angles, the first reflective mirror 54 and second reflective mirror 55 intersecting at a first baseline 516 of the U-groove and the second reflective mirror 55 and third reflective mirror 56 intersecting at a second baseline 517 of the U-groove; a comb-drive microactuator 500 provided on the platform 52 (see FIG. 4A). In this embodiment, the comb-drive microactuator 500 serving as an actuator is the same as the comb-drive microactuator 400 as shown in FIG. 3A. Details of the comb-drive microactuator are not repeated therein. Brief descriptions with respect to the functions of a suspended comb unit 500 (identical to the suspended comb unit 440 in FIG. 3A) and a shutter 560 connected to and supported by a center of the suspended comb unit 500, are provided. The feature that differs the shutter 560 from the shutter 460 in FIG. 3A lies in that, an upper surface of the shutter 560 is plated with a high reflectivity metal film to form a fourth reflective mirror 57. Because the shutter 560 may be actuated by the comb-drive microactuator 500 to move between or to remain still at a first position and a second position, it serves as movable reflective mirror. The fourth reflective mirror 57 may serve to reflect optical signal under an OFF state (such as the first position); details of the device serving as an optical switch will be described later on.

When the first pair of parallel fibers and second pair of parallel fibers form the retro-reflective type optical signal processing device 50 of this invention, the operation of the optical switching function of the retro-reflective type optical signal processing device 50 is obtainable by the followings operation. When the shutter 560 is actuated by the comb-drive microactuator 500 to the first position (OFF state), the first incident optical signal 504 from the first optical signal input unit 502 and the second incident optical signal 510 from the second optical signal input unit 508 are each reflected off by the fourth reflective mirror 57 of the shutter 560 to form a first reflective optical signal 511 and a second reflective optical signal 505 leaving through the second optical signal output unit 509 and first optical signal output unit 503, respectively. When the shutter 560 is actuated by the comb-drive microactuator 500 to the second position (ON state), a first incident optical signal 504 from the first optical signal input unit 502 is reflected off by the second reflective mirror 55 and third reflective mirror 56 to form a third reflective optical signal 512 leaving through the first optical signal output unit 503; a second incident optical signal 510 from the second optical signal input unit 508 is reflected off by the second reflective mirror 55 and first reflective mirror 54 to form a fourth reflective optical signal 513 leaving through the second optical signal output unit 509. Hence, another feature of the retro-reflective type optical signal processing device 50 of this invention lies in that, when the shutter 560 remains still at the OFF state, optical signal from Fiber A may be switched to Fiber D and optical signal from Fiber C may be switched to Fiber B. When the shutter 50 remains still at the ON state, optical fiber from Fiber A may be switched to Fiber B and optical ž optical signal from Fiber C may be switched to Fiber A, as narrated at the left hand side of FIG. 4B.

OFF: A→D, C→B
ON: A→B, C→D

Hence, another feature of the retro-reflective type optical signal processing device 50 of this invention lies in that, by adopting the electrostatic driven process as described in the second embodiment and the switching operation described above, the comb-drive microactuator 500 is able to actuate the shutter 560 to the ON state or OFF state so as to allow the optical signals to pass or reflected to change the direction of the optical signals, thereby attaining the switching function of an optical switch, for ready implementation in an optical communication network(s).

FIG. 4C is a schematic view taking alone lines D–D' in FIG. 4A. The processing method the third embodiment of this invention is substantially identical to that disclosed in FIGS. 3C~3G. The feature the differs that third embodiment from the second embodiment lies in that, on a silicon substrate, a vertical groove having functions equivalent to two normal retro-reflective mirrors is etched on a (100) plane of silicon by anisotropic wet etch. Because the etching rate of a (110) plane of silicon subjected to an etchant (such as KOH) is less than that of a (100) plane of silicon, two (110) planes of silicon that form a 90° with the silicon substrate surface are exposed after a given etching time. A groove having vertical sidewalls may also be etched from the silicon substrate by anisotropic dry etching. A high reflectivity metal film is then sputtered over the groove by sputtering, electroplating, or chemical deposition to form a first reflective mirror 54, a second reflective mirror 55 and a third reflective mirror 56. The remaining steps are not repeated herein. The cross-section of the silicon substrate along lines D–D' is shown in FIG. 4C.

Figure 4D:
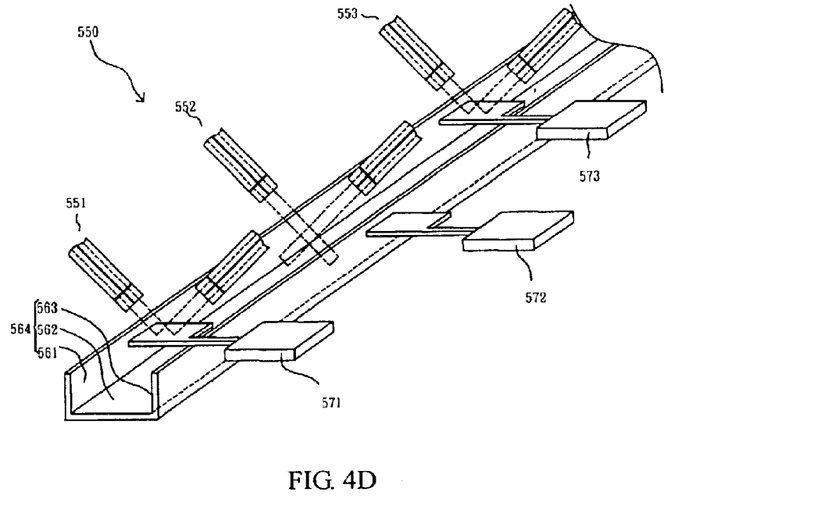
FIG. 4D is a perspective, schematic view of a third embodiment of the retro-reflective type optical signal processing device array according to this invention.

As shown in FIG. 4D, plural retro-reflective type optical signal processing device 50 according to the third embodiment of this invention may also be embodied to construct a retro-reflective type optical signal processing device array 550, including: a first retro-reflective type optical signal processing device 551, a second retro-reflective type optical signal processing device 552 and a third retro-reflective type optical signal processing device 553, that are the same as the retro-reflective type optical signal processing device 50 shown in FIGS. 3 and 4B. Details of the comb-drive microactuator, electrodes, and actuating control apparatus are the same and, thus, not repeated herein. A comb diagram is used in FIG. 4D to represent a comb-drive microactuator, wherein the first retro-reflective type optical signal processing device 551 and third retro-reflective type optical signal processing device 553 are actuated by a first comb-drive microactuator 571 and a third comb-drive microactuator 573 to an OFF state, respectively. The second retro-reflective type optical signal processing device 552 is actuated by a second comb-drive microactuator 572 to an ON state. One feature of the embodiment of the retro-reflective type optical signal processing device array 550 lies in that, each of the retro-reflective type optical signal processing devices 551, 552, 553 may each perform as an optical switch. Another feature of this embodiment lies in that, the retro-reflective micro-mechanical-electrical reflective unit 564 having a first reflective mirror 561, a second reflective mirror 562 and a third reflective mirror 563 may serve to perform the optical switching function of an optical switch. Furthermore, plural retro-reflective type optical signal processing device arrays 550 in this embodiment may be, at desires, constructed into a single or plural lenses structure array, serving as a 1×2 or 2×2 switch array, for ready implementation in an optical communication network(s).

Fourth Embodiment

Figure 5:
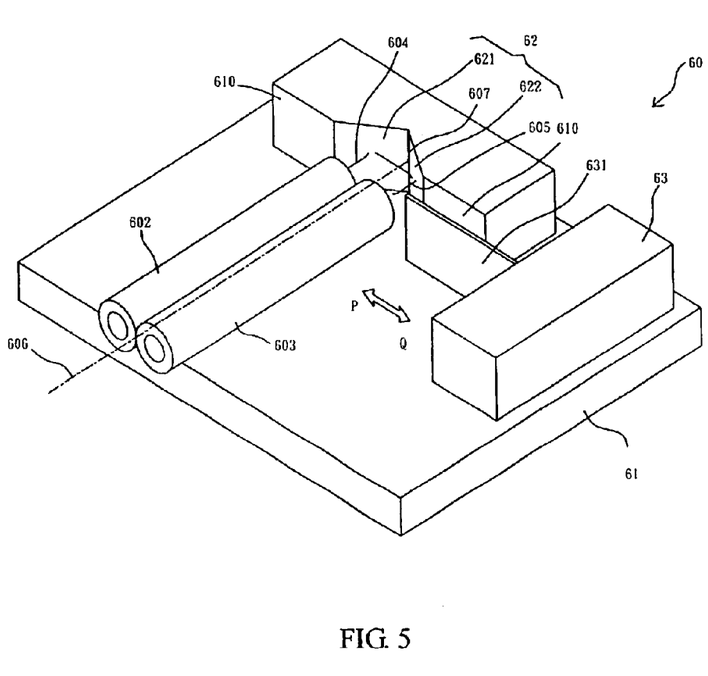
FIG. 5 is a perspective, schematic view of a fourth embodiment of the retro-reflective type optical signal processing device according to this invention.

FIG. 5 is a perspective, schematic view of a fourth embodiment of the retro-reflective type optical signal processing device according to this invention under the assembling and operative state. The retro-reflective type optical signal processing device 60 according to the fourth embodiment comprises: paired parallel fibers, having an input fiber 602 and an output fiber 603, for inputting an incident optical signal 604 and outputting a reflective optical signal 605, respectively; a retro-reflective micro-mechanical-electrical reflective unit 62, having a first reflective mirror 621 and a second reflective mirror 622 normal to the silicon substrate 61, each forming an included angle of 45° with a vertical plane on a silicon substrate 61, the two reflective mirrors forming an included angle of 90° therebetween to take a form of a 90° V-groove and intersecting at a baseline 607 of the V-groove; a microactuator 63 provided on the substrate 61, for actuating a shutter 631 to move along the PQ directions based on different control signals to all distances within a blocking range, or to remain still at any position of all distances, for blocking part of the incident optical signal 604 or part of the reflective optical signal 605. Because the blocking range due to shutter movement may range from 0% (no blocking) to 100% (all blocking), one feature of the fourth embodiment of the retro-reflective type optical signal processing device 60 of this invention lies in that, the reflective optical signal 605 may be varied by varying the incident optical signal 604, so as to serve as a variable optical attenuator for ready implementation in an optical communication network(s).

As shown in FIG. 5, one feature of the fourth embodiment of this invention lies in that, only a single assembling process is needed to assemble the retro-reflective type optical signal processing device 60. The assembling process comprises the steps of: placing a centerline 606 of the paired parallel fibers (or 2-fiber capillary) to be normal to a normal plane 610; and aligning the centerline 606 with the baseline 607 formed of intersecting the first reflective mirror 621 and second reflective mirror 622, such that the incident optical signal 604 is able to project towards the first reflective mirror 621 at an incident angle of 45°, and then reflected off by the second reflective mirror 622 at a reflective angle of 45°. Because the second reflective mirror 622 and first reflective mirror 621 are normal to one another by an included angle of 90°, a reflective optical signal 605 is formed by reflecting the incident optical signal 604 that is projected towards the second reflective mirror 622 at an incident angle of 45°, off the second reflective mirror 622 at a reflective angle of 45°. In an optimum state, the reflective optical signal 605 is output from the output fiber 603 100% to complete a retro-reflective optical signal processing process. Further, the input port of the input fiber 602 and the output port of the output fiber 603 may be connected to a light source and a signal sensor, respectively, to assist in assembling and positioning.

The optimum positioning by adopting above-mentioned assembling step is not exclusive. Such as shown in FIG. 5, so long as the incident optical signal 604 of paired parallel fibers, reflective optical signal 605, and centerline 606 of the paired parallel fibers are co-planar, and the reflective optical signal 604 is projected towards the first reflective mirror 44 at an angle less then 45°, the incident optical signal 604 will be surely parallel to the reflective optical signal 605 and projected towards an opposite direction while the vertical distance between the two parallel signals varies along with the incident position. Hence, by continuously adjusting the incident optical signal 604 projecting towards the first reflective mirror 621 at an appropriate incident angle that subjects the vertical distance between the incident optical signal 604 and reflective optical signal 605 in parallel equals to the gap between the centers of the paired parallel fibers, the reflective optical signal 605 may completely enter the output fiber 603.

As shown in FIG. 5, the retro-reflective reflective mirror and shutter in the fourth embodiment of this invention may be fabricated by MEMS techniques, such as anisotropic etch or three-dimensional self-alignment structure, or by other techniques for fabricating the optical reflective components and their assembly. Furthermore, plural retro-reflective type optical signal processing devices 60 according to the fourth embodiments may be, at desires, embodied to construct a single or plural lenses structure array, serving as a single channel or multiple channels network retro-reflective type optical signal processing device having the feature of a variable optical attenuator, for ready implementation in an optical communication network(s).

In the first to fourth embodiments, the retro-reflective micro-mechanical-electrical reflective units, shutters and microactuators in the retro-reflective type optical signal processing devices may be fabricated by adopting wafer-level or packaging technology for fabricating pertinent components in the system in an integral manner to respective wafer, or by adopting bonding or die bonding technology for securing all components made independently to respective wafer. Conventional wafer-wafer bonding technology is then adopted to bond and preload the two wafers. The wafers are than cut to obtain the optical signal processing devices. The manufacturing process is then concluded by the optical fiber positioning step, sealing step, and housing step.

The above embodiments are intended for describing this invention without limiting the scope that this invention may be applied. Modifications made in accordance with the disclosures of this invention without departing from the spirits of this invention are within the scope of this invention.

NOMENCLATURE SEQUENCE LISTING

Prior Art:
111—flat position
112—reflective position
113—automatic high-precision control apparatus
121, 131, 602—input fiber
122, 132, 603—output fiber
123, 124—ball lens
125, 130—variable optical attenuator
126, 63—actuator
133—profiled blade
134—upper capacitive plate
135—lower capacitive plate
136—cantilever beam
201a—first optical signal input fiber
201b—first optical signal output fiber
201c—second optical signal input fiber
201d—second optical signal output fiber
225—optical switch actuator
226—comb drive
127, 227, 560, 631—shutter
231—circulator
232—first port
233—second port
234—third port
235—control apparatus This Invention:
30, 34, 40, 50, 60—retro-reflective type optical signal processing device
33, 37—microactuator
331, 371, 460—shutter
41, 51, 61—silicaon substrtat
42, 52—plateform
32, 36, 43, 53, 464, 564, 62—retro-reflective micro-mechanical-electrical reflective unit
44, 54, 321, 462, 491, 561, 621—first reflective mirror
45, 55, 322, 463, 492, 562, 622—second reflective mirror
46, 494—insulative layer
47—first electrode
48—second electrode
49—third electrode
56, 563—third reflective mirror
57—foruth reflective mirror
400, 500—comb-drive microactuator
302, 351, 402—input fiber
303, 352, 403—output fiber
304, 353, 404—incident optical signal
305, 354, 405—reflective optical signal
355, 406—centerline of parallel fibers
361—reflective mirror
410—first comb unit
420—second comb unit
430—third comb unit
440—suspended comb unit
411, 421, 431—stators
412—first base
422—second base
432—third base
441—rotors
442—cantiliver
443—first suspension unit
444—second suspension unit
445—third suspension unit
446—fourth suspension unit
447—foruth base
448—fifth base
449—sixth base
450, 550—retro-reflective type optical signal processing device array
451, 551—first retro-reflective type optical signal processing device
452, 552—second retro-reflective type optical signal processing device
453, 553—third retro-reflective type optical signal processing device
454—seventh base
461—shutter centerline
466, 571—first comb-drive microactuator
467, 572—second comb-drive microactuator
468, 573—third comb-drive microactuator
471—first reflective optical signal
472—second reflective optical signal
473—third reflective optical signal
474—first incident optical signal
475—second incident optical signal
476—third incident optical signal
495—electrode
496—sacraficial layer
497—comb-drive microactuator structure adnshutter
502—first optical signal input unit
503—first optical signal output unit
504—first incident optical signal
505—second reflective optical signal optical signal
506—centerline of first parallel optical fibers
507 centerline of —second parallel optical fibers
508—second optical signal input unit
509—second optical signal output unit
510—second incident optical signal
511—first reflective optical signal optical signal
512—third reflective optical signal optical signal
513—fourth reflective optical signal optical signal
516—first baseline
517—second baseline
604—incident optical signal
605—reflective optical signal optical signal
606—centerline of parallel optical fibers
407, 607—baseline
610—normal plane of a retro-reflective micro-mechanical-electrical reflective unit

What is claimed is:

1. A retro-reflective type optical signal processing device comprising:

a micro-electro-mechanical (MEM) reflective unit having a first reflective mirror plane and a second reflective mirror plane formed on a silicon substrate, incoming optical signals from an input port incident to the first reflective mirror plane being reflected forward to the second reflective mirror plane, thereby reflected optical signals incident to the second reflective mirror plane being reflected again, second reflected optical signals being transmitted froward to an output port, such that the transmission directions of input and output optical signals are opposite and parallel to each other;

a set of movable shutters formed on said silicon substrate are allocated at light transmission routes of the input port to the MEM reflective unit, and from the MEM reflective unit to the output port, wherein the optical signal intensity is controllable by changing a position of the set of movable shutters to a position selected from the group consisting of totally blocking, totally reflecting, partially blocking and partially reflecting an optical light beam;

wherein the units of optical signal input ports and optical signal output ports being chosen from the group consisting of fibers and waveguides, wherein the set of movable shutters is connected to a set of microactuators formed on said silicon substrate and moved by this set of microactuators, this set of microactuators capable of holding said shutter at appropriate position along with the light transmission routes according to the relative optical requirement.

2. The retro-reflective type optical signal processing device array composed of plural retro-reflective type optical signal processing devices set forth in claim 1, wherein the array serves as a single or multiple channels optical attenuator array, for ready implementation in an optical communication network(s).

3. The retro-reflective type optical signal processing device array set forth in claim 2, wherein the multiple channels share single or plural reflective mirrors.

4. The retro-reflective type optical signal processing device set forth in claim 1, wherein two sets of two parallel ports consist of a first port as an input channel and a second port as an output channel of each of the two sets, two different optical signals from two input ports of each sets transmit toward a retro-reflective unit including three reflective mirror planes, where the shutter is at a position enabling the optical signals to pass by, when the shutter is in an ON state, thereafter the two sets of retro-reflected optical signals transmit backward independently to the output ports of each corresponding set of the two sets, when the shutter is allocated at the position of an off state, thus the two different optical signals from two input ports of each sets transmit toward the said reflective mirror surface of said shutter, the incoming signals will reflected independently toward the corresponding output ports of opposite sets, thereby this device has the capability to switch 2 sets of retro-reflected optical light transmission paths by holding the shutter at an ON state or an OFF state so that a 2×2 optical switching function is demonstrated by the retro-reflective type optical signal processing device.

5. The retro-reflective type optical signal processing device set forth in claim 1, wherein the set of microactuators is selected from the group consisting of electrostatic actuators, thermal actuators, electrothermal actuators, electromagnetic actuators, and piezoelectric actuators.

6. The retro-reflective type optical signal processing device set forth in claim 1, wherein the set of movable shutters is made of one of an opaque substrate having microstructures selected from spheres, triangles, rectangles and polygons, and a material capable of adjusting the reflectivity of the set of movable shutter and capable of adjusting the transmitted light intensity.

7. The retro-reflective type optical signal processing device set forth in claim 1, further comprising an optical signal intensity sensor at an input end and output end thereof, for transmitting a feedforward or a feedback signal to control circuits for controlling the microactuators to manipulate a required attenuated intensity.

8. The retro-reflective type optical signal processing device set forth in claim 1, further comprising an optical sensor intensity sensor next to the movable shutter for sensing intensity of the optical signal blocked by the movable shutter and subsequently reflected away from an original transmission route, for transmitting a feedforward or a feedback signal to control circuits for controlling the microactuators to manipulate a required attenuated intensity.

9. The retro-reflective type optical signal processing device set forth in claim 1, wherein the optical path further includes a collimating lens, collecting lens, a ball lens, a cylindrical lens, a refractor such as Fresnel lens, other non-spherical lenses and optical components so as to enhance transmission efficiency and coupling efficiency of the optical signal in the retro-reflective type optical signal processing device, and to reduce signal dissipation in transmission by refracting the optical signal.

* * * * *